Dec. 7, 1954  J. S. CROMEANS ET AL  2,696,495
SEPARATION OF OXYGENATED ORGANIC COMPOUNDS
Filed Jan. 4, 1950
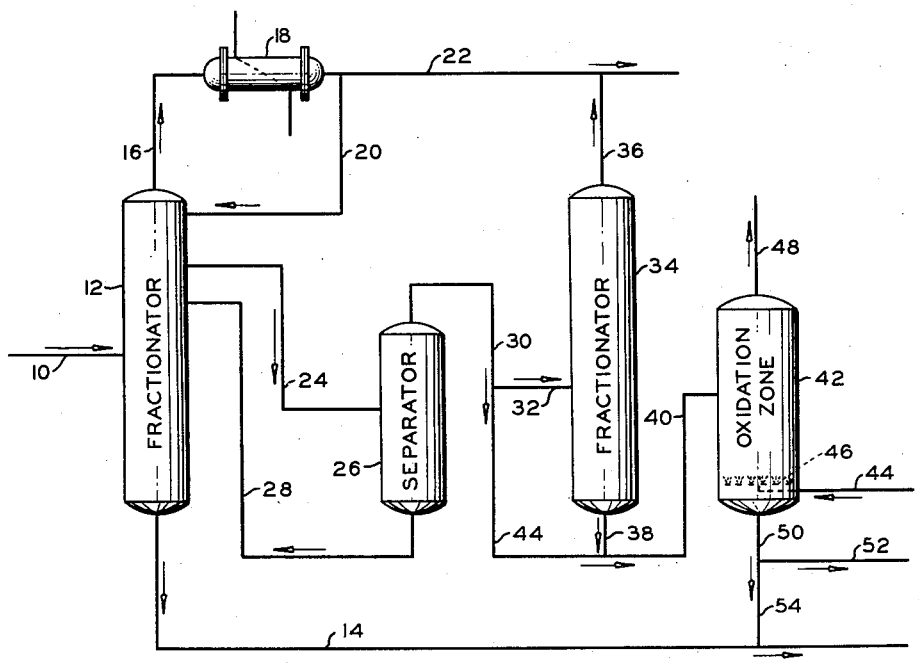
INVENTORS.
J.S. CROMEANS
N.C. CARTER
BY
ATTORNEYS

United States Patent Office 2,696,495
Patented Dec. 7, 1954

2,696,495

SEPARATION OF OXYGENATED ORGANIC COMPOUNDS

John S. Cromeans, Dewey, and Norman C. Carter, Bartlesville, Okla., assignors to Phillips Petroleum Company, a corporation of Delaware Application January 4, 1950, Serial No. 136,768

7 Claims. (Cl. 260—450)

This invention relates to the separation of oxygenated organic compounds. In one aspect this invention relates to a novel process for the recovery of oxygenated organic compounds from the aqueous phase of the effluent from a carbon monoxide hydrogenation process. In a more specific embodiment this invention relates to a novel method of fractionally distilling that aqueous phase.

Numerous problems in the separation and recovery of the oxygenated compounds from the aqueous phase of the Fischer-Tropsch product are well recognized. This aqueous phase is comprised of about 85 to 90 per cent water, the remainder comprising a mixture of alcohols, ketones, aldehydes and organic acids. Of these organic oxygenated compounds, ethyl alcohol is present in greater amount than any other single component, its concentration often being in the range of 40 to 50 volume per cent of the total oxygenated material. The numerous components present, the relatively small proportion of a great many of these components and the many azeotroping mixtures encountered thus present quite a complex problem in separation, especially when the separation must be economically practical to be of any value commercially.

Ordinarily, the processes whereby these oxygenated compounds are separated and recovered utilize a first step in which the aqueous phase is fractionated to separate an overhead fraction in which the aldehydes, ketones and alcohols are concentrated and an aqueous kettle fraction in which the acidic compounds are concentrated. The overhead fraction may then be further processed by ordinary and extractive distillation, solvent extraction and the like, to recover individual components thereof. The kettle fraction is also processed for recovery of the acids present, for example, by neutralization with caustic and subsequent evaporation of the water and recovery of the non-volatile salts. The actual composition of the aqueous phase and the organic material therein is quite variable, and they depend to a large extent upon the reaction conditions at which the synthesis reaction is effected. In any event, the number of compounds in the aqueous phase and the proximity of boiling points of the individual compounds and their azeotropes make it comparatively difficult to obtain by fractionation a sharp separation between the acid-containing water as kettle product and the lower boiling overhead fraction.

It is an object of this invention to provide a novel process for the separation of oxygenated organic compounds.

It is another object of this invention to provide a novel process for fractionally distilling the aqueous phase resulting from the hydrogenation of carbon monoxide.

It is another object of this invention to provide a novel process for fractionally distilling such an aqueous phase to obtain acid-containing water as kettle product and lower boiling oxygenated organic compounds as overhead.

It is a further object of this invention to effect such a fractional distillation to obtain an improved separation between the kettle product and the overhead fraction.

Further and additional objects of our invention will be readily apparent from the detailed disclosure hereinbelow.

We have found that, in the initial distillation of the aqueous phase resulting from the catalytic hydrogenation of carbon monoxide, the non-ideality of the distillation characteristics of the mixture makes possible an improved method for segregating the various components into a kettle product of water containing organic acids and an overhead of lower boiling components whereby the overall difficulty of separation is substantially decreased. We have found that, in a continuous multi-plate fractional distillation, of this aqueous phase to separate an acid-containing water phase as a kettle product and those compounds and azeotropes boiling below water as an overhead product, a side stream containing oxygenated organic compounds that would normally contaminate the kettle product and/or the overhead fraction can be withdrawn from the fractionator. Consequently, the compounds thus removed, which are relatively high molecular weight oxygenated organic compounds, need not be removed from the overhead fraction and the kettle product in subsequent separate operations. The compounds thus removed are readily oxidizable to organic acids, and as such their removal and recovery from the system is facilitated. Furthermore, the number of different compounds in the side stream and the low concentration of the individual compounds makes recovery of the individual compounds difficult and uneconomical in many cases.

The accompanying drawing is a schematic diagram of one method of effecting our process. We have intentionally excluded from this drawing conventional equipment, such as pumps, gauges, compressors, valves, flow controllers, pressure and temperature control equipment, and the like, but the inclusion of such equipment is believed to be readily apparent to one skilled in the art.

Referring now to the accompanying drawing, the aqueous phase from the catalytic hydrogenation of carbon monoxide enters the system via line 10 and passes into fractionator 12. The various methods of catalytically hydrogenating carbon monoxide and of separating the normally liquid effluent into an organic phase and an aqueous phase are well known in the art, and the details of those steps will not be included herein. The feed to fractionator 12 contains, in addition to water, low-boiling alcohols, acids, aldehydes and ketones, in varying proportions, and the feed is introduced to the column at about the midpoint thereof, or slightly above the midpoint. The column is operated in such a manner that the overhead fraction contains propanol and lower boiling compounds, including azeotropic water, and the kettle product contains organic acids and water. To effect the desired separation in column 12, the overhead temperature is at least 75° C. but below the boiling point of water at the operating pressure. At atmospheric pressure the overhead temperature is within the range of 75 to 85° C., and at a pressure of 30 pounds per square inch gauge the overhead temperature is 105 to 115° C. Actually, the use of pressure operation enables a reduction in the size of the column and in operating costs. Column 12 is preferably rated at at least 16 theoretical plates, and, when rated at 16 theoretical plates, the feed is introduced to the column at about 10 theoretical plates above the kettle. The reflux ratio at which column 12 is operated varies over a relatively wide range. In experimental work we found a reflux ratio within the range of 3.5 to 4.5 to be satisfactory and preferable, but reflux ratios within the range of 2.5 to 7.0 or higher are suitable for our operation. Although we prefer to introduce the feed to column 12 at about the midpoint, the feed may be introduced to the column well above the midpoint and below the top of the column. For example, in actual experimental work employing a 96 inch column, we usually introduced the feed to the column 48 inches above the kettle, but we also obtained satisfactory results when the feed entered 66 inches above the kettle. One advantage is gained by introducing the feed above the midpoint, since the portion of the column below the feed point acts as a stripping section. By increasing the height of this stripping section we decreased the concentration markedly in the kettle product of those oxygenated compounds that we desired to take overhead. The kettle product from column 12, containing organic acids, water, and less than one volume per cent lower-boiling oxygenated organic compounds, is withdrawn via line 14. The overhead fraction from column 12, containing lower-boiling oxygenated organic compounds, is withdrawn via line 16 and condenser 18. That portion of the overhead that is required for reflux is returned to the column via line 20, and the remaining portion of the overhead is recovered via line 22. The overhead thus recovered contains readily separable organic compounds, and it can be treated by any suitable means (not shown), for example, by further fractionation, to recover the individual components or commercially useful mixtures of the components.

From a point intermediate the top and bottom of column 12, a side stream is withdrawn via line 24. This draw-off is preferably made above the feed tray to the column but below the tray to which the reflux is returned. However, it is possible to obtain satisfactory results by withdrawing the side stream below the feed tray. The side stream thus withdrawn contains two phases, i. e., an aqueous phase and an organic phase, and the mixture is passed to separator 26 where it stratifies into an upper organic phase and a lower aqueous phase. The organic phase contains butanol and higher boiling alcohols and relatively high molecular weight aldehydes and ketones, i. e., aldehydes and ketones containing at least four carbon atoms per molecule. It is desirable to remove these high molecular weight compounds as described, because they tend to accumulate in column 12, and eventually they contaminate the overhead fraction and kettle product from the column if not removed as described. The solubility characteristics of the components of the side stream determine the composition of the two phases in separator 26, and those components which are miscible in all proportions with water and of relatively high volatility, for example, ethanol, tend to appear in the aqueous phase or to remain in the column as vapor. The organic phase in separator 26 will, of course, contain lower-boiling oxygenated organic compounds, i. e., methanol, ethanol, acetone and acetaldehyde, but these compounds are present in relatively small quantities, particularly when compared with the total amount of these compounds introduced to column 12. In some instances it is desirable to cool the side stream either prior to passage into separator 26 or while in that separator in order to produce the desired distribution of oxygenated compounds between the aqueous and organic phases. The aqueous phase, containing, in addition to water, organic acids and lower-boiling oxygenated compounds, is withdrawn via line 28 and returned to column 12, preferably near the point of withdrawal of the side stream. The aqueous phase can be returned to column 12 on the same tray from which the side stream is removed via line 24, and preferably not more than one tray below the point of side stream removal.

The organic phase is removed from separator 26 via line 30. Since this organic phase contains some of the components of the overhead from column 12, it is sometimes desirable to pass the organic phase via line 32 to fractionator 34 where those compounds boiling no higher than propanol are taken overhead via line 36 and admixed with the compounds withdrawn via line 22. The kettle product is withdrawn from column 34 via line 38 and passed via line 40 to oxidation zone 42. In some instances it is uneconomical to separate the low-boiling oxygenated compounds from the organic phase passing via line 30, and, in that event, the organic phase is passed directly to zone 42 via lines 44 and 40. It will be understood that column 34 is considerably smaller than column 12 since the volume of feed to the former is much less than the volume of feed to the latter.

The feed stream to oxidation zone 42 contains readily oxidizable organic compounds, for example, aldehydes and ketones, and in zone 42 these readily oxidizable compounds are oxidized to organic acids. The aldehydes and ketones act as oxidation initiators for the reaction, but, after oxidation has commenced, these compounds are, in turn, oxidized to form organic acids. To effect the oxidation, air or other gas containing substantially no reactive constituent other than oxygen is passed into zone 42 via line 44 and distributor 46. Gaseous effluent from zone 42 is removed via line 48. The conditions in zone 42 are effective for the conversion of the oxidizable compounds in the feed stream to organic acids. For example, the temperature is within the range of 10 to 150° C. and the pressure is sufficient to maintain the feed in liquid phase, preferably from 1 to 50 atmospheres. The oxidation reaction can be effected non-catalytically, but it is also within the scope of our process to employ a catalyst for the reaction. Any suitable oxidation catalyst, for example, organic acid salts of manganese, lead, and the like, can be effectively employed in zone 42.

The oxidation product from zone 42 is removed via line 50 and conducted to a separation step (not shown) via line 52. This product contains organic acids and relatively high-boiling alcohols, for example, butanol and pentanol. In the separation of the oxidation product, the acids are removed by means of a caustic wash and the remaining oxygenated organic compounds are fractionated into separate cuts comprising essentially single alcohols. Alternatively, the product from zone 42, or a portion thereof, can be withdrawn via lines 50 and 54 and admixed with the kettle product from column 12 passing via line 14. This kettle product contains organic acids similar to those in the product stream from zone 42. In this manner the organic acids from column 12 and zone 42 are recovered in the same recovery steps. It is also within the scope of our process to remove at least some of the water from the kettle product from column 12 prior to recovery of the organic compounds in order to reduce the cost and size of equipment required for the recovery of the organic compounds.

The point at which side stream 24 is withdrawn from column 12 is dependent upon varying factors. Among these variables are the feed rate to the column, the composition of the feed, the column design, the reflux ratio, the point of feed introduction, the desired purity of the overhead fraction and kettle product, and the like. We prefer to withdraw the side stream above the feed tray, but it is possible to operate the column in such a manner that satisfactory results are obtained by withdrawing the side stream below the feed tray. Such operation tends to increase the concentration of organic acids in the side stream and to reduce the concentration therein of the compounds that we desire to take overhead. Since the oxidation step produces organic acids, it is not necessary to remove the organic acids from the side stream prior to passage to the oxidation step, but a substantial portion of the organic acids is returned to column 12 via line 28.

One of the primary advantages of our process is an increase in the purity of the overhead fraction and/or the kettle product from column 12. If the side stream is not removed from column 12, as described above, the overhead fraction and kettle product contain oxygenated organic compounds whose presence is usually undesirable, and whose presence necessitates additional purification of the overhead fraction and kettle product.

The following example is illustrative of our invention.

*Example*

The aqueous phase recovered from the Fischer-Tropsch condensed effluent is continuously fractionated in a column rated at 16 theoretical plates to produce an overhead product comprising principally ethyl alcohol-water azeotrope and lower boiling material, though containing some propanol-water azeotrope. The kettle product comprises water and organic acids. These two fractions are processed by conventional methods for the recovery of pure components or commercially useful mixtures.

A two-phase side stream is withdrawn at a point somewhat above the feed entry, and this side stream is then conducted to a gravity settling tank. The aqueous lower phase is removed and recycled to the column and the upper organic phase is removed to an oxidation tank wherein it is contacted at somewhat elevated temperature with air in order to oxidize the readily-oxidizable components to organic acids. The liquid material recovered is then fractionated to separate those materials boiling in the range of the overhead product (n-propyl alcohol and lighter) from the first fractionation step, these then being combined with the first overhead product for processing to effect a separation of components. The higher-boiling portion from this latter fractionation step is then processed by conventional methods to segregate the organic acids, following which the remainder, comprising butanol and higher alcohols, is separated by fractionation. Alternatively, the oxidate or selected fractions thereof may be returned to column 12 if desired.

Numerous modifications and variations within the scope of our invention will be apparent to those skilled in the art from the above disclosure.

We claim:

1. A method for recovering oxygenated organic compounds from the aqueous phase in the normally liquid effluent from the catalytic hydrogenation of carbon monoxide, said aqueous phase consisting of 85 to 90% water and organic compounds comprising alcohols, ketones, aldehydes, and organic acids, which comprises fractionally distilling said aqueous phase to take overhead a fraction containing propanol and lower-boiling organic compounds and to obtain a kettle product containing water and organic acids, withdrawing from said fractional distillation step a side stream containing an aqueous phase including organic acids and lower-boiling oxygenated compounds and an organic phase comprising aldehydes and ketones containing at least 4 carbon atoms per molecule, separating said aqueous phase from said organic phase by stratification in a phase separation zone, and returning said aqueous phase to the fractional distillation step.

2. A method for recovering oxygenated organic compounds from the aqueous phase in the normally liquid effluent from the catalytic hydrogenation of carbon monoxide which comprises fractionally distilling said aqueous phase at an overhead temperature of at least 75° C. but below the boiling point of water at the operating pressure so as to recover an overhead fraction containing propanol and lower boiling organic compounds and to obtain a kettle product containing principally water and organic acids, withdrawing from said fractional distillation step a side stream containing an aqueous phase including organic acids and lower-boiling oxygenated compounds and an organic phase comprising aldehydes and ketones containing at least 4 carbon atoms per molecule, separating said aqueous phase from said organic phase by stratification in a phase separation zone, and returning said aqueous phase to the fractional distillation step.

3. A method for recovering oxygenated organic compounds from the aqueous phase in the normally liquid effluent from the catalytic hydrogenation of carbon monoxide which comprises fractionally distilling said aqueous phase to take overhead and recover a fraction containing propanol and lower-boiling organic compounds and to obtain a kettle product containing water and organic acids, withdrawing from said fractional distillation step a side stream containing an aqueous phase including organic acids and lower-boiling oxygenated compounds and an organic phase comprising aldehydes and ketones containing at least 4 carbon atoms per molecule, separating said aqueous phase from said organic phase by stratification in a phase separation zone, returning said aqueous phase to the fractional distillation step, oxidizing the aldehydes and ketones in said organic phase to the corresponding acids, and recovering organic acids resulting from said oxidation step and from the kettle product from said fractional distillation step.

4. A method for recovering oxygenated organic compounds from the aqueous phase in the normally liquid effluent from the catalytic hydrogenation of carbon monoxide which comprises introducing said aqueous phase to the midpoint of a fractionating column, fractionally distilling said aqueous phase in said column to take overhead and recover a fraction containing propanol and lower-boiling organic compounds and to obtain a kettle product containing water and organic acids, withdrawing from said column above the point of introduction of said aqueous phase a side stream containing an aqueous phase including organic acids and lower-boiling oxygenated compounds and an organic phase comprising aldehydes and ketones containing at least 4 carbon atoms per molecule, separating said aqueous phase from said organic phase by stratification in a phase separation zone, returning said aqueous phase to the fractional distillation step, oxidizing the aldehydes and ketones in said organic phase to the corresponding acids, and recovering organic acids resulting from said oxidation step and from the kettle product from said fractional distillation step.

5. The method according to claim 4 wherein the fractional distillation step is effected utilizing a reflux stream at a reflux ratio of 3.5 to 4.5 and wherein the side stream is withdrawn below the point at which the reflux stream enters the column.

6. The method according to claim 4 wherein to effect the oxidation of the organic phase air is contacted with said organic phase at a temperature of 10 to 150° C. and at a pressure sufficient to maintain said organic phase in a liquid phase.

7. A method for recovering oxygenated organic compounds from the aqueous phase in the normally liquid effluent from the catalytic hydrogenation of carbon monoxide which comprises introducing said aqueous phase to the midpoint of a fractionating column, fractionally distilling said aqueous phase in said column to take overhead and recover a fraction containing propanol and lower-boiling organic compounds and to obtain a kettle product containing water and organic acids, withdrawing from said column above the point of introduction of said aqueous phase a side stream containing an aqueous phase including organic acids and lower-boiling oxygenated compounds and an organic phase comprising aldehydes and ketones containing at least 4 carbon atoms per molecule, separating said aqueous phase from said organic phase by stratification in a phase separation zone, returning said aqueous phase to the fractional distillation step, fractionating said organic phase so as to take over-head propanol and lower boiling organic compounds contained therein and obtain the heavier aldehydes and ketones as a bottoms fraction, oxidizing the aldehydes and ketones in said bottoms fraction to the corresponding acids, and recovering the resulting organic acids.

References Cited in the file of this patent

UNITED STATES PATENTS

| Number | Name | Date |
| --- | --- | --- |
| 1,721,959 | James | July 23, 1929 |
| 2,411,809 | Rupp et al. | Nov. 26, 1946 |
| 2,416,377 | Chadder | Feb. 25, 1947 |
| 2,476,788 | White | July 19, 1949 |
| 2,505,752 | Burton | May 2, 1950 |
| 2,558,557 | Hess et al. | June 26, 1951 |
| 2,586,929 | Fleming et al. | Feb. 26, 1952 |

OTHER REFERENCES

Robinson et al., "Elements of Fractional Distillation," 3d edition (1939), pages 76–80; McGraw-Hill Book Co., Inc., New York.